Figure 1:
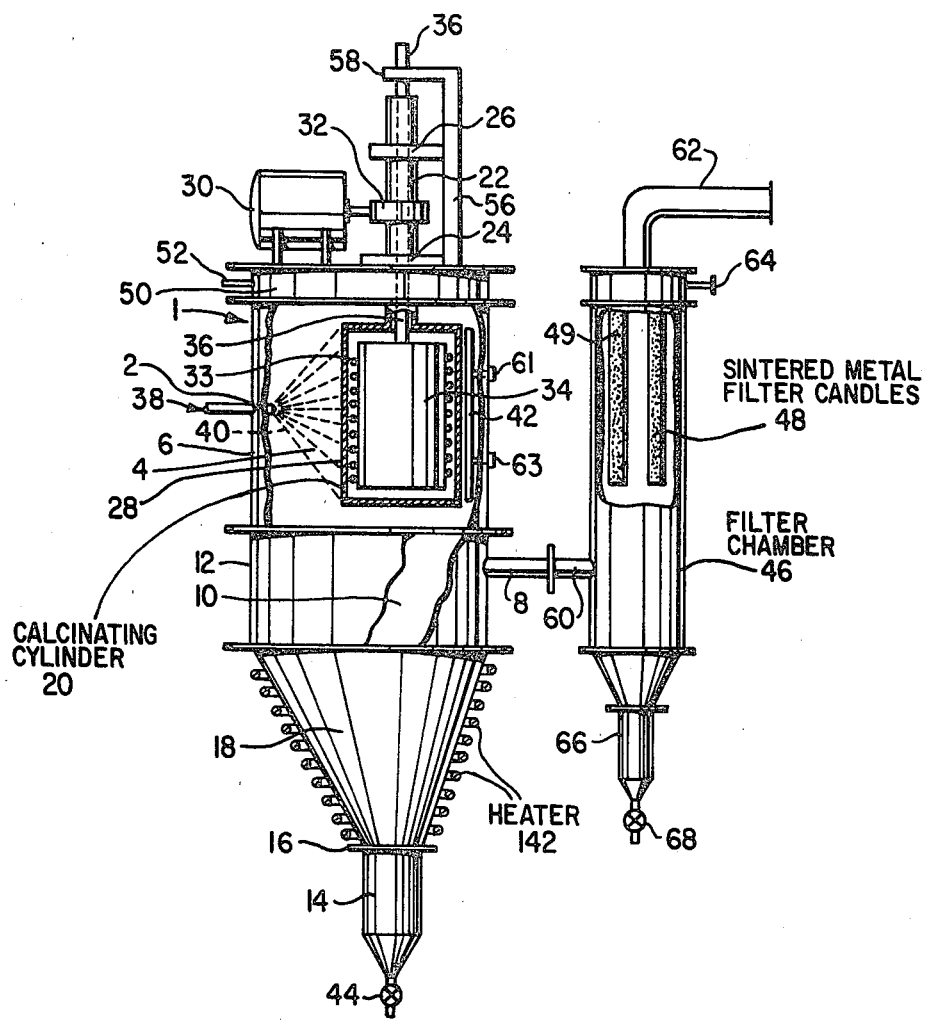

United States Patent [19]

Sridhar

[11] 4,334,953
[45] Jun. 15, 1982

[54] APPARATUS FOR EVAPORATING RADIOACTIVE LIQUID AND CALCINATING THE RESIDUE

[75] Inventor: T. Sampat Sridhar, Pinawa, Canada

[73] Assignee: Atomic Energy of Canada Limited, Ottawa, Canada

[21] Appl. No.: 210,038

[22] Filed: Nov. 24, 1980

[30] Foreign Application Priority Data

Mar. 18, 1980 [CA] Canada .................................. 348326

[51] Int. Cl.³ ............................................. B01D 1/22
[52] U.S. Cl. .................................. 159/11 R; 252/632; 159/DIG. 12; 55/523
[58] Field of Search ...................... 159/3, 11 R, 10, 29, 159/DIG. 12, 47 WC, 49, 48 R; 252/632; 55/523

[56] References Cited

U.S. PATENT DOCUMENTS

3,101,258  8/1963  Johnson .............................. 252/632
3,907,506  9/1975  Malafosse ......................... 159/11 R

FOREIGN PATENT DOCUMENTS

837967  6/1960  United Kingdom ....... 159/DIG. 12

Primary Examiner—Norman Yudkoff
Attorney, Agent, or Firm—Francis W. Lemon

[57] ABSTRACT

Apparatus for evaporating radioactive liquid and calcinating the residue wherein the radioactive liquid is sprayed across the interior of a casing on to the heated, external surface of a hollow drum so that the droplets evaporate and partially calcinate as they cross the casing interior and then adhere to the drum for a sufficient period to be calcinated thereon. A scraper scrapes the calcinated residue from the drum.

4 Claims, 3 Drawing Figures

APPARATUS FOR EVAPORATING RADIOACTIVE LIQUID AND CALCINATING THE RESIDUE

This invention relates to an apparatus for evaporating radioactive liquid and calcinating the residue.

Calcination technology is employed for the solidification and denitration of metal nitrate streams such as those of nuclear fuel metal nitrates of U, Pu and Th as well as other radioactive waste streams such as the High and Medium level wastes, that are generated in the various nuclear fuel-cycle operations. In many countries, it is now mandatory to solidify such streams prior to any long-term storage or eventual disposal. Several types of calcination equipment have been employed for this purpose, and these can be classified as follows:

| I | Batch type: | Pot calciner |
|---|---|---|
| II | Continuous type: | (1) Rotary, Screw or Trough Calciner |
| | | (2) Spray Calciner |
| | | (3) Fludized-Bed Calciner |

The continuous calciners are superior to the batch type in terms of scale-up, operating flexibility, large throughput etc., and are being employed in various facets of the nuclear industry. The applicability of a particular type of calciner is largely dictated by the nature of the liquid to be treated, the treatment objectives as well as the specific merits and demerits inherent in each equipment type.

For example, for the specific case of calcination of high-level waste solutions, the primary drawbacks for the different continuous calciner types are given below:

FLUID-BED CALCINER

At any time during its operation the fluid-bed calciner has a high inventory of solids in a suspended state forming the fluidized bed. In the case of treatment of high-level waste solution the bed consists of the calcined products which are highly self-heating type due to their activity, and collapse of the bed due to any loss of the fluidizing medium could result in severe temperature excursions and instabilities. Further, to maintain the bed in a fluidized state large volumes of the fluidizing gas are necessary which impose a heavy burden on subsequent off-gas cleaning facilities.

SPRAY CALCINER

The spray calciner essentially operates on radiant heat transfer for the calcination process to occur, and this necessitates high wall temperatures to be employed. As calcination proceeds, continuous deposition and build-up of calcine on the inner wall tends to progressively reduce the heat transfer coefficient. Also, the spray calciner employs finely atomized feed which results in the uncontrolled production of large quantity of fines that tend to frequently clog the off-gas filter system.

ROTARY CALCINER

The types of rotary calciners employed in the nuclear industry have many internal moving parts that require frequent maintenance. While such calciners may be entirely satisfactory for treatment of certain inactive feeds, as in the production of uranium oxide from uranyl nitrate, for the treatment of highly active feeds where remote operation is mandatory, maintenance is difficult and expensive. Further, there is also the hazard of the fines produced damaging the moving parts and rendering them inoperative.

In general, any calciner that incorporates fast moving internal or external mechanisms, such as for example high-speed rotors to effect feed dispersion, would suffer from reliability and maintenance problems especially where long-term continuous remote operation with highly active feed material is a primary requirement. Yet another factor for consideration is the ease with which the calciner can be decontaminated as and when required with a minimum of downtime. This means that the internal surfaces of the calciner should be readily accessible to the decontamination solutions that may be employed. Most rotary calciners in existence fail to meet these specific requirements.

A detailed description of the various calciner systems employed for the treatment of nuclear high-level waste solutions in different countries is given in Techniques for the Solidification of High-Level Waste, Technical Reports Series, No. 176, International Atomic Energy Agency, Vienna, Austria 1977.

There is a need for a radioactive liquid evaporating and residue calcinating apparatus which circumvents many of the problems encountered in the above mentioned known types and is capable of handling a wide variety of feeds, including those with finely suspended solids. The desirability of having an apparatus that could handle a very wide variety of feeds especially in the treatment of nuclear waste solutions cannot be overemphasized as wastes of varying characteristics result from the processing of different types of nuclear fuels.

According to the present invention there is provided a radioactive liquid evaporating and residue calcinating apparatus, comprising:

(a) an upwardly extending casing having at least one radioactive liquid inlet to the interior of an upper portion of the casing, a vapour and gas outlet from the interior of an intermediate portion of the casing, and a calcinated residue outlet from the lower end of a bottom portion of the casing, (b) a hollow, calcinating cylinder within the casing, (c) mounting means rotatably mounting the hollow cylinder within the intermediate portion of the casing with a portion of the curved external surface of the hollow cylinder facing the at least one radioactive liquid inlet from across the interior of the intermediate portion, (d) driving means for rotating the hollow cylinder, (e) heating means within the hollow cylinder for heating the said portion of the curved, external surface of the hollow cylinder to a calcinating temperature for the radioactive liquid, (f) atomizing means, mounted in the at least one radioactive liquid inlet, for directing an atomized spray of the radioactive liquid across the interior of the upper portion of the casing and on to the said portion of the curved external surface of the hollow cylinder, (g) scraping means mounted in the upper portion of the casing, for scraping calcinated residue from the curved external surface of the hollow cylinder, (h) a valve attached to the calcinated residue outlet for releasing calcinated residue from the casing, and (i) calcinated residue filtering means connected to vapour and gas.

Figure 2:
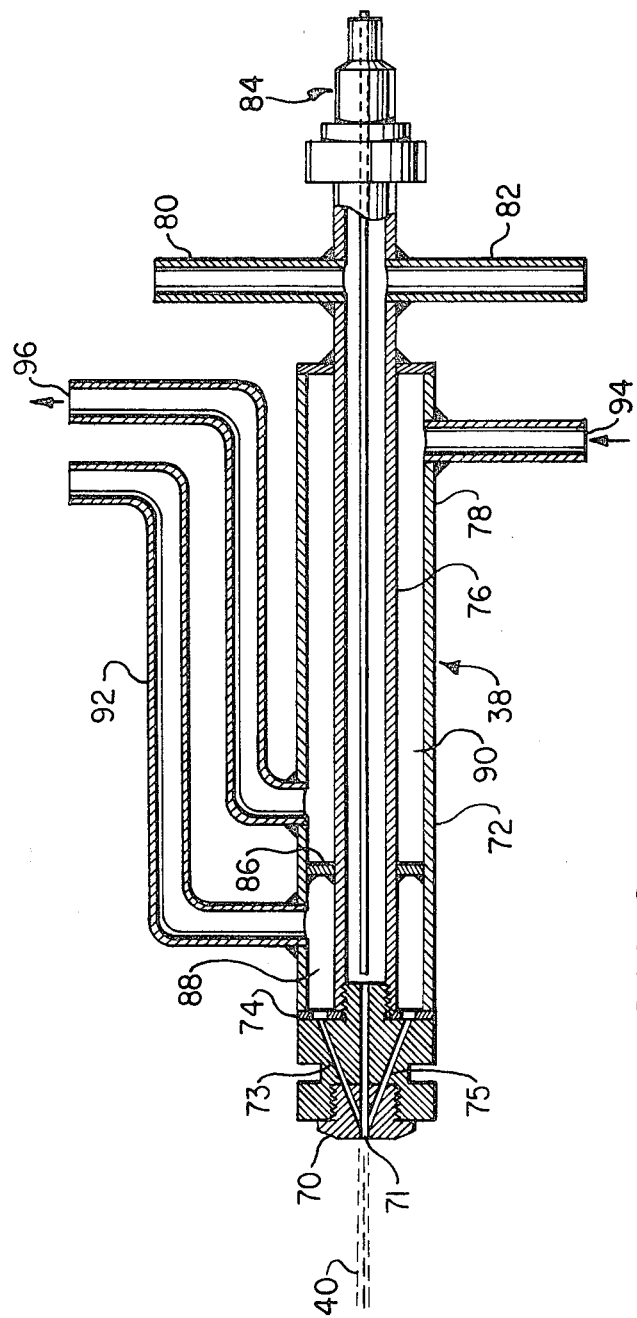
Figure 3:
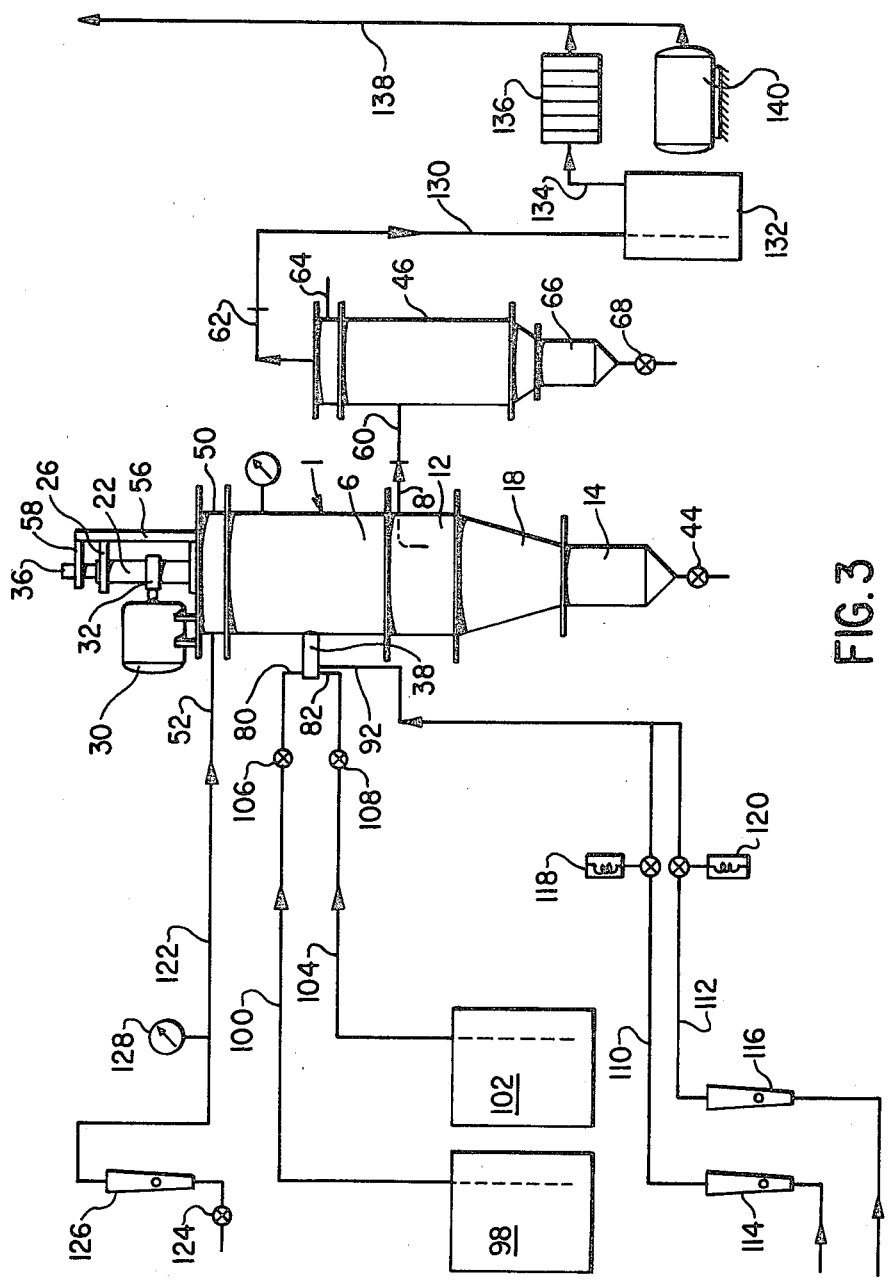

In the accompanying drawings which illustrate, by way of example, an embodiment of the present invention, FIG. 1 is a partly sectioned side view of a radioactive liquid evaporating and residue calcinating apparatus, FIG. 2 is a partly sectioned side view of an atomizing spray nozzle of the apparatus shown in FIG. 1, and FIG. 3 is a flow diagram of a radioactive liquid treating system for the calcination of a thorium nitrate solution and incorporating the apparatus shown in FIGS. 1 and 2.

In FIG. 1, there is shown a radioactive liquid evaporating and residue calcinating apparatus, comprising:

(a) an upwardly extending casing 1 having at least one radioactive liquid inlet 2 to the interior 4 of an upper portion 6 of the casing 1, a vapour and gas outlet 8 from the interior 10 of an intermediate portion 12 of the casing 1, and a calcinated residue outlet in the form of a receiver 14 from the lower end 16 of a bottom portion 18 of the casing 1, (b) a hollow, calcinating cylinder 20 within the casing 1, (c) mounting means, in the form of a hollow shaft 22 and bearings 24 and 26, rotatably mounting the hollow cylinder 20 within the intermediate portion 12 of the casing 1 with a portion 28 of the curved external surface of the hollow cylinder 20 facing the at least one radioactive liquid inlet 2 from across the interior 10 of the intermediate portion 12, (d) driving means, in the form of a variable speed electric motor 30 and a gear mechanism 32, for rotating the hollow cylinder 20, (e) heating means, in the form of an electrical heating coil 33 wound on a non-rotatable cylinder 34 and supported within the hollow cylinder 20 by a non-rotatable shaft 36, for heating the portion 28 of the curved external surface of the hollow cylinder 20 to a calcinating temperature for the radioactive liquid, (f) atomizing means 38, mounted in the at least one radioactive inlet 2, for directing an atomized spray 40 of the radioactive liquid across the interior of the upper portion 6 of the casing 1 and on to the portion 28 of the curved external surface of the hollow cylinder 20, (g) scraping means, in the form of two adjustable scrapers, one of which is shown and designated 42, mounted in the upper portion 6 of the casing 1, for scraping calcinated residue from the curved external surface of the hollow cylinder 20, (h) a rotary valve 44 attached to the receiver 14 for releasing calcinated residue from the casing 1, and (i) calcinated residue filtering means, in the form of a filter chamber 46 containing a plurality of stainless steel, sintered metal filter candles, two of which are shown and designated 48 and 49, connected to the vapour and gas outlet 8.

The filter chamber 46 is heated in a conventional manner by means not shown to prevent any condensation of the vapours therein.

A gas purge chamber 50 is provided on the casing 1 with a purge gas inlet 52, with the purge gas flowing into the chamber 28 through an annulus around the hollow shaft 22, and the variable speed electric motor is mounted on the gas purge chamber 50.

The bearings 24 and 26 are attached to a bracket 56 which is also mounted on the gas purge chamber 50. The non-rotatable shaft 36 is also supported by an arm 58 of the bracket 56.

The adjustable scrapers, such as scraper 42, are adjustably attached in a known manner to the upper portion 6 of the casing 1 by adjustable supports 61 and 63 with the scrapers equally spaced from the atomizing means 38 an angle of 90° apart from the axis of rotation of the hollow cylinder 20 and on the opposite side thereof from the atomizing means 38.

The filter chamber 40 has a vapour and gas inlet 60 connected to the vapour and gas outlet 8, a filtered vapour and gas outlet 62 and a gas blow-back inlet 64 for periodic cleaning of the filters such as 48 and 49. A fines receiver 66 is connected to the lower end of the filter chamber 46 and has a fines releasing rotary valve 68.

Referring now to FIG. 2, the atomizing means 38 comprises a nozzle block 70, having a nozzle orifice 71 with air lines 73 and 75 thereto and which emits a uniform, flat spray 40, and a main body 72. The main body 72 is sealed to the nozzle block 70 by a gasket 74 and comprises an inner tubular casing 76 and an outer jacket 78 around the inner tubular casing 76. The inner tubular casing 76 has radioactive liquid inlet 80, a liquid additive inlet 82, and a spring-loaded clean-out nozzle plunger assembly 84. The outer jacket 78 has a partition 86 dividing the interior thereof into an atomizing air (or steam) compartment 88 adjacent and cooling water compartment 90. The compartment 88 has an inlet 92 and the compartment 90 has an inlet 94 and an outlet 96.

In FIG. 3 similar parts to those shown in FIGS. 1 and 2 are designated by the same reference numerals and the previous description is relied upon to describe them.

In FIG. 3, the radioactive liquid inlet 80 is connected to a feed tank 98, by line 100, containing, for example, radioactive thorium nitrate liquid waste. One or more liquid additive tanks, such as that designated 102, are provided for supplying cleaning water for the atomizing means 38 or calcination additives, such as, for example, formic acid along line 104. Lines 100 and 104 contain valves 106 and 108 respectively. The liquid waste is atomized at the atomizing means by compressed air or superheated steam delivered along line 100. Auxiliary air bleed is supplied to the atomizing means 38 along line 112. The lines 110 and 112 contain rotameters 114 and 116, respectively and solenoid operated valves 118 and 120, respectively.

Purge air is supplied to gas purge chamber 54 along line 122 which contains a valve 124, a rotameter (trade name) 126 and a pressure gauge 128.

Filtered gas from the filter chamber 46 is delivered by line 130 to a caustic bubbler 132 and then by line 134 to a final filter 136 before being vented to atmosphere along line 138. A vacuum pump 140 may be provided for operating the radioactive liquid evaporating and residue calcinating apparatus at subatmospheric pressures.

Referring now to FIGS. 1 to 3, for continuous operation, pressurized air (or superheated steam) is continuously fed along line 110 while radioactive thorium nitrate liquid waste is siphoned thereby along line 100 from the feed tank 98, together with additives along line 104. Cooling water is fed to the inlet 94 of the atomizing means 38 from a source (not shown).

The interior 4 of the upper portion 6 of the casing 1 is heated by the heating coil 33 so that the droplets of the atomized spray 40 of radioactive thorium nitrate liquid waste in their trajectory across the interior 4, towards the heated surface portion 28 of the hollow, calcinating cylinder 20, undergo rapid concentration, partial solidification and calcination and on contacting the heated surface portion 28, adhere to it for a brief residence period to be further calcinated with complete evaporation of the liquid of the droplets.

During the brief residence time on the heated surface portion 28, which by the way is changing as the hollow, calcinating cylinder 20 is rotated, the dehydration solidification and calcination of the droplets is completed and the layer of solids deposited thereby on the hollow, calcinating cylinder 20 is calcined until it falls off the hollow, calcinating cylinder 20 or is dislodged therefrom by the scraper blades, one of which is shown and designated 42.

The partial solidifaction and calcination of the droplets, prior to them adhering as a layer on the hollow, calcinating cylinder 20 for further calcination and subsequent removal therefrom, as well as the non-requirement of a very fine spray, results in the reduction of the significant production of fines that is experienced in other calcinating processes for radioactive liquid wastes.

The calcined granules together with some calcined fines are continuously produced and fall through the bottom portion 18 for collection in the receiver 14 from where they can be continuously removed by operating the valve 44. If desired the bottom portion 18 of the casing may also be heated for further calcination of the falling product by a heater 142 (FIG. 1).

Passing purge air along line 122 through the gas purge chamber 54 prevents any acid vapours from reaching the bearings 24 and 26 and the gear mechanism 32 as well as isolating these members from the high calcinating temperatures.

After evaporation of the liquid of the droplets it remains evaporated with no part of this liquid existing in a liquid phase at any time within the casing after being evaporated and fines entrained in evaporated liquid leaving the casing 1 by outlet 8 are filtered therefrom in the filter chamber 46 which is provided with a gas blow-back inlet 64 for periodically cleaning the filters therein.

The apparatus shown involves no feed pumps but a pressurized feed for atomization may also be used if the apparatus is operated, at a positive pressure. Clearly the apparatus can, if desired, be operated at either a positive pressure, or at a subatmospheric pressure using the vacuum pump 140.

If the apparatus is to be operated in an intermittent feed mode then auxiliary air bleed is fed to the atomizing means along line 112 to prevent caking in the nozzle tip between consecutive spray action.

The apparatus shown in FIGS. 1 to 3 has been constructed and tested and has been found to perform very well for a wide variety of radioactive liquids and operating conditions. Liquids containing radioactive heavy element nitrates such as thorium nitrate and uranium nitrate and mixtures thereof as well as different types of simulated high level nuclear waste solutions have been calcined to solid products in the apparatus shown in FIGS. 1 to 3.

For the purpose of illustration, the operating conditions and results obtained are given below for calcinating a feed solution of radioactive thorium nitrate in the apparatus shown in FIGS. 1 to 3. A white granular product was obtained and no problems were encountered in the continuous calcination process.

| Feed Solution: | Thorium Nitrate |
|---|---|
| Concentration: | 300 g Th/L of solution |
| $HNO_3$ = | 2M |

| Operating Conditions | |
|---|---|
| R.P.M. of hollow cylinder 20 = | 2 RPM |
| Casing 1 internal pressure = | Atmospheric |

| Temperatures | |
|---|---|
| Hollow cylinder 20 = | 400° C. |
| Interior 4 of casing 1 = | 250° C. |
| Interior of bottom portion 18 = | 250° C. |
| Interior of filter chamber 46 = | 250°C. |

| Flow Rates | |
|---|---|
| Feed - | 1.5 L/h |
| Atomizing Air - | 100-300 L/h |

| Product Calcine Composition (Dry basis) | |
|---|---|
| $ThO_2$ - | 89.9% |
| Residual Nitrate - | 10.1% |
| Weight percent of fines | (<100 mesh) in combined calcine |
| Product = | 10% |

In other embodiments of the present invention the hollow, calcinating cylinder 20 is mounted from the side of the casing 1 to rotate about a horizontal axis with scrapers such as 42 mounted to extend horizontally on the remote side of the hollow calcinating cylinder 20 from the at least one radioactive inlet 2.

In yet other embodiments of the present invention, instead of electrical resistance heating, the portion 28 of the curved external surface of the hollow cylinder 20 is heated to a calcinating temperature for the radioactive liquid by induction heating, microwave-heating, propane or other gas heating or steam heating.

In yet further embodiments of the present invention, instead of adjustable scrapers, an adjustable chain pressed against the external surface of the hollow cylinder 20 has been used to scraper calcinated residue therefrom.

In yet further embodiments of the present invention the bottom portion 18 of the casing is heated by induction heating for the further calcination of the falling product.

I claim:

1. Radioactive liquid evaporating and residue calcinating apparatus, comprising:
   (a) an upwardly extending casing having at least one radioactive liquid inlet to the interior of an upper portion of the casing, a vapour and gas outlet from the interior of an intermediate portion of the casing, and a calcinated residue outlet from the lower end of a bottom portion of the casing,
   (b) a hollow, calcinating cylinder within the casing,
   (c) mounting means rotatably mounting the hollow cylinder within the intermediate portion of the casing with a portion of the curved external surface of the hollow cylinder facing the at least one radioactive liquid inlet from across the interior of the intermediate portion, (d) driving means for rotating the hollow cylinder, (e) heating means within the hollow cylinder for heating the said portion of the curved, external surface of the hollow cylinder to a calcinating temperature for the radioactive liquid, (f) atomizing means, mounted in the at least one radioactive liquid inlet, for directing an atomized spray of the radioactive liquid across the interior of the upper portion of the casing and on to the said portion of the curved external surface of the hollow cylinder, (g) scraping means mounted in the upper portion of the casing, for scraping calcinated residue from the curved external surface of the hollow cylinder, (h) a valve attached to the calcinated residue outlet for releasing calcinated residue from the casing, and (i) calcinated residue filtering means connected to the vapour and gas outlet.

2. An apparatus according to claim 1, wherein the heating means comprises a non-rotatable cylinder within the hollow cylinder and an electrical heating coil wound on the non-rotatable cylinder.

3. An apparatus according to claim 1, which includes a gas purge chamber on the casing, the mounting means rotatably mounting the hollow cylinder comprises a shaft passing through the gas purge chamber and bearings mounted on the gas purge chamber and rotatably securing the shaft in position, and the driving means comprises an electric motor mounted on the gas purge chamber and coupled to the shaft.

4. An apparatus according to claim 1, which includes a heater in the bottom portion of the casing for heating the bottom portion of the casing to a calcinating temperature.

* * * * *